United States Patent
Crast et al.

(10) Patent No.: US 6,485,377 B1
(45) Date of Patent: Nov. 26, 2002

(54) DUAL CURABLE COATING

(75) Inventors: Steven C. Crast, San Clemente, CA (US); Walter Skrabski, San Diego, CA (US); Kevin A. Heene, Carlsbad, CA (US); David A. Valia, San Diego, CA (US); Brent Puder, Sunnyvale, CA (US)

(73) Assignee: Callaway Golf Company, Carlsbad, CA (US)

( * ) Notice: Subject to any disclaimer, the term of this patent is extended or adjusted under 35 U.S.C. 154(b) by 155 days.

(21) Appl. No.: 09/593,574

(22) Filed: Jun. 14, 2000

(51) Int. Cl.⁷ ............................................... A63B 37/00
(52) U.S. Cl. ......................................... 473/351; 528/44
(58) Field of Search ................. 473/351, 318; 428/355 R, 356, 343, 346; 528/44

(56) References Cited

U.S. PATENT DOCUMENTS

| | | | |
|---|---|---|---|
| 3,804,421 A | * 4/1974 | Alex et al. | 473/351 |
| 5,409,233 A | * 4/1995 | Kennedy | |
| 5,459,220 A | * 10/1995 | Kennedy | |
| 5,770,325 A | * 6/1998 | Keller et al. | |
| 5,785,612 A | * 7/1998 | Shapiro et al. | |
| 6,057,043 A | * 5/2000 | Kametani et al. | |
| 6,210,796 B1 | * 4/2001 | Lobert et al. | 428/355 R |

FOREIGN PATENT DOCUMENTS

JP      60-141584    * 7/1985

* cited by examiner

*Primary Examiner*—Mark S. Graham
*Assistant Examiner*—Raeann Gorden
(74) *Attorney, Agent, or Firm*—Michael A. Catania

(57) ABSTRACT

The present invention is directed at a dual curable coating that exhibits superior adhesion to ultraviolet curable inks and base coats. The present invention is preferably utilized as a top coat for a golf ball. The dual curable coating may be a tinted top coat or a clear coat. The dual curable coating includes a dual-curing component that is selected from the group of pentaerythritol tetraacrylate, hydroxy ethyl acrylate, hydroxy ethyl methacrylate, hydroxy propyl acrylate, hydroxy propyl methacrylate, caprolactone acrylate and polyproplene glycol monomethacrylate.

1 Claim, 1 Drawing Sheet

DUAL CURABLE COATING

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to a dual curable coating for a substrate. More specifically, the present invention relates to a top coating for a golf ball that has dual curability.

2. Description of the Related Art

Top coats are used on the exterior surfaces of a variety of substrates. Top coats serve to enhance the aesthetic appearance of the substrate as well as act as a barrier to protect the substrate from weathering, mechanical agitation and the like. One such substrate in which top coats are of particular importance is a golf ball.

A golf ball generally comprises a one-piece construction or it may include several layers including a core and an outer cover surrounding the core. Typically, one or more layers of paint and/or topcoat are applied to the exterior surface of the golf ball. For example, in one typical design, the exterior surface of the golf ball is first painted with at least one clear or pigmented base coat primer along with at least one application of a top coat. The basecoat and/or primer and top coat are applied to the golf ball to enhance the aesthetic appearance of the ball as well as mask or cover surface blemishes that may have resulted from the manufacturing process. The top coat is particularly important, in that the coat protects any markings, trademarks, logos, or the like that may be placed on the exterior surface of the ball.

Typically, the outer coating layers of a golf ball comprise a primer along with a clear urethane top coat. For example, U.S. Pat. No. 5,459,220 discloses a two-pack urethane top coat for a golf ball that uses separate packages of a polyol and diisocyanate that employs biurets and isocyanurate trimers of hexamethylene diisocyanate (HDI) as the crosslinking agents. U.S. Pat. No. 5,409,233 discloses a clear coating for use on a golf ball that incorporates a solvent system that includes methylamyl ketone.

Logos or indicia for a golf ball have been applied to the top coat surface instead of the base coat surface. Such a golf ball is disclosed in Yamana, Japanese Laid Open Patent Application Number 60-141584 for Printing Method For Golf Balls, which was filed in Japan in 1983. The Yamana patent discloses an ultraviolet ("UV") light curable ink for the logo, and also discloses applying the logo to top coat. The UV light curable ink (urethane modified acrylic resin type ink) disclosed in the Yamana patent was manufactured by Toyo ink and the ink had sufficient durability to be used on a playable golf ball based on the absence of chipping and the retention of the logo after 50 hits against a steel plate at 45 meters per second.

Another example of a logo applied to the top coat is Shapiro et al., U.S. Pat. No. 5,785,612, for a Golf Ball, which was filed in 1996. The Shapiro patent discloses indicia formed from an UV light curable ink, and which is applied to a golf ball only having a top coat on the cover.

In the development of top coats, the primary issue is related to the adhesion of the top coat to the base coat, or the cover of the golf ball. The logo or indicia has been designed to adhere to the base coat or the top coat. However, the golf ball industry has yet to address providing for adherence of the top coat to the logo or indicia, particularly a logo or indicia based on a UV light curable ink.

BRIEF SUMMARY OF THE INVENTION

The present invention provides a solution to the problem of adhesion of indicia to a top coat. The present invention is able to resolve this problem by providing a top coat having a dual curable compound.

One aspect of the present invention is a coating for a golf ball having pentaerythritol triacrylate. Another aspect of the present invention is a golf ball having a cover, a base coat on the cover and a top coat on the base coat. The top coat includes a polyisocyanate component and a polyol component. The polyol component includes a dual-curing component in an amount ranging from 2 to 10 part per weight of the polyol component. The dual curing component may be pentaerythritol triacrylate, or a mixture of pentaerythritol mono-acrylate, pentaerythritol di-acrylate, pentaerythritol triacrylate and/or pentaerythritol tetraacrylate.

Yet another aspect of the present invention is a coating for dual curing application. The coating a polyisocyanate component and a polyol component. The polyol component includes a dual-curing component in an amount ranging from 2 to 10 part per weight of the non-activator component, at least one solvent in an amount of 50 to 70 parts per weight of the polyol component, an optical brightener in an amount of 0.01 to 0.03 parts per weight of the polyol component, thixotropic additive in an amount of 2 to 8 parts per weight of the polyol component, an adhesion promoter component in an amount of 0.25 to 1.0 parts per weight of the polyol component, and a polyester resin in an amount of 20 to 40 parts per weight of the polyol component.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
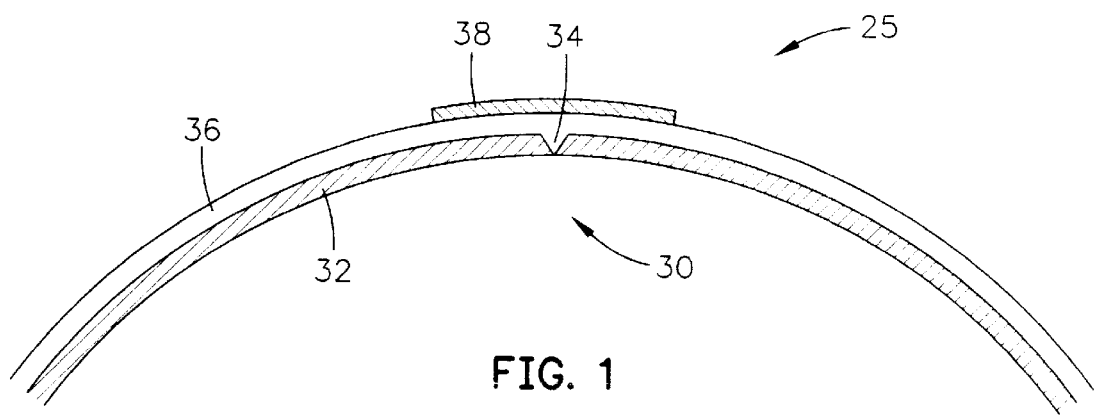
FIG. 1 is a cross-sectional view of a golf ball having indicia applied over the top coat.

A golf ball generally comprises a one-piece construction or it may include several layers including a core and an outer cover surrounding the core. The cover of the golf ball is preferably made of any number of materials that are based on ionomeric, thermoplastic, elastomeric, urethane, balata (natural or synthetic), polybutadiene or any combination of the above. A polyurethane base coat is applied to the cover of a golf ball to whiten the cover. The top coat of the present invention is applied directly to the polyurethane base coat, and should chemically adhere to the base coat. Indicia is applied to the top coat or between the base coat and top coat. The top coat of the present invention has dual curability to promote adhesion to the base coat and to the indicia which is typically composed of a UV curable ink. Adhesion is used to describe the ease to which the top coat bonds to the base coat and the indicia. Abrasion, on the other hand, refers to the ability of the top coat to retain and maintain its glossiness in response to weathering and use.

The dual curability is the main aspect of the coating of the present invention. A compound having dual curability enables the top coat to react with an isocyanate group of a base coat and an acrylate group of a UV curable ink for indicia. Thus, the dual curable top coat provides superior adhesion for the indicia, as well as superior adhesion to the base coat.

The top coat of the present invention principally includes two components, namely a polyol component and isocyanurate component. According to the present invention, the polyol component preferably comprises a compound having dual curability. The isocyanurate component preferably comprises a blend of polyisocyanate prepolymers.

The polyol component may be a clear coat or a tinted top coat. The clear coat version is used over indicia that has been applied to the base coat. The tinted top coat is used when the indicia is applied over the tinted top coat. A tinted top coat is also utilized to reduce or eliminate tip marks that may occur from holding of the unfinished golf ball during the application of the base coat.

A general description of the polyol component of the clear coat now follows. The polyol component includes a polyester resin in an amount of 20 to 40 parts per weight of the polyol component. The polyol component also includes a compound having dual curability, preferably pentaerythritol triacrylate ("PETA"), in an amount of 2 to 10 parts per weight of the polyol component. The polyol component also includes a solvent in an amount of 40 to 70 parts per weight of the polyol component. In the present invention, the solvent blend used in the polyol component of the clear coat may comprise any of the following in any ratio: methyl ethyl ketone, methyl isobutyl ketone, ethyl acetate, butyl acetate, propyleneglycolmonomethyl ether acetate, toluene or xylene.

To assure a rapid tack-free time, even at elevated bake temperatures, a cure accelerator, or catalyst should be used in the polyol component formulation. Primary and secondary amines, tin-based catalysts, and metallic octoates are catalysts that may be used in the polyol component. A preferred catalyst is dibutyltin dilaureate.

In addition, it is preferable that the polyol component further includes an adhesion promoter such as epoxidized silane and/or polyfunctional aziridine. Additional components of the polyol component can include a thixotropic resin and flow additives.

Table One shown below lists on a weight basis the range of the various materials used in the polyol component of the clear coat.

TABLE 1

Polyol Component

| MATERIAL | PARTS BY WEIGHT |
| --- | --- |
| Solvent Blend | 30.0–70.0 |
| Thixotropic Resin | 1.0–7.0 |
| Flow Additive | 0.1–1.0 |
| Adhesion Promoter | 0.1–1.0 |
| Accelerator or catalyst | 0.01–3.00 |
| Optical Brightener | 0.005–0.1 |
| Dual Curable Compound (PETA) | 2.0–10.0 |

A general description of the polyol component of the tinted top coat now follows. The polyol component includes a white pigment grind base in an amount of 40 to 70 parts per weight of the polyol component. The white pigment grind base includes solvents as described above in reference to the clear coat polyol component, titanium dioxide, grind aids and polyester resins. The polyol component also the compound having dual curability, preferably PETA, in an amount of 2 to 10 parts per weight of the polyol component. The polyol component also includes additional solvents in an amount of 20 to 40 parts per weight of the polyol component, and the solvents may be selected from methyl ethyl ketone, methyl isobutyl ketone, ethyl acetate, butyl acetate, propyleneglycolmonomethyl ether acetate, toluene and xylene.

The tinted top coat polyol component has a cure retarder, such as 2,4-pentanedione, in an amount of 1 to 3 parts per weight of the polyol component. The polyol component may further include an adhesion promoter such as epoxidized silane and/or polyfunctional aziridine, and tinting aids.

Table Two shown below lists on a weight basis the range of the various materials used in the polyol component of the tinted top coat.

TABLE 2

Polyol Component

| MATERIAL | PARTS BY WEIGHT |
| --- | --- |
| White Pigment Grind Base | 30.0–70.0 |
| Solvents | 15.0–45.0 |
| Cure Retarder | 1.0–3.0 |
| Tinting Aids | 0.1–0.5 |
| Adhesion Promoter | 1.0–4.0 |
| Dual Curable Compound (PETA) | 2.0–10.0 |

A description will now be given of the polyisocyanate component of the top coat that may be used with the clear coat or tinted top coat components. According to the present invention, the polyisocyanate component includes a biuret of hexamethylene diisocyanate (HDI) or a blend of a biuret of HDI and an isocyanurate trimer of HDI. The use of HDI improves the drying and curing characteristics of the top coat by decreasing drying time while still offering superior abrasion resistance. Preferably, the ratio (weight basis) of the two resins should be about 50% to about 60% of the biuret to about 50% to about 40% of the trimer based on equivalent weights of functional isocyanate. In addition, a solvent blend is preferably a component of the polyisocyanate component of the polyurethane clear coat. The solvent blend used in the polyisocyanate component of the top coat may comprise any of the following at any ratio: methyl ethyl ketone, methyl isobutyl ketone, ethyl acetate, butyl acetate, propyleneglycolmonomethyl ether acetate, toluene and xylene.

Table Three shown below lists on a weight basis the range of the various materials used in the polyisocyanate component of the top coat.

TABLE 3

Polyisocyanate component

| MATERIAL | PARTS BY WEIGHT |
| --- | --- |
| Solvent Blend | 30.0–60.0 |
| Isocyanurate Trimer of HDI | 10.0–30.0 |
| HDI Biuret | 30.0–60.0 |

Prior to coating the exterior of the golf ball cover, the polyol component and the polyisocyanate component are combined to form the dual curable top coat of the present invention. When combining the two components a stoiciometric index ratio of the polyester polyol component to polyisocyanate component should not be less than 1.25:1.00 (NCO:OH) and most preferred within the range of about 1.25 to about 1.50 equivalents of polyisocyanate to 1.00 equivalents polyol. This results in mixing the polyol with the polyisocyanate at ratios (weight basis) ranging from 1:1 up to 5:1, depending on the stoichiometric ratio outlined above. The PETA offers the unique advantage of a dual curability. The pendant hydroxyl reacts with an isocyanate group of the polyisocyanate component while the multifunctional acrylate portion of the PETA reacts with the acrylate compounds in traditionally fee radically cured UV inks. This reaction enhances the adhesion and abrasion of the UV curable indicia as compared to traditional top coats. PETA is an isomeric blend of tri-functional and tetra-functional acrylates. Typically, the ratio of tri-functional to tetra-functional isomer is preferably 75:25, more preferably 85:15 and most preferably 95:5. These multi-functional monomers contain pendant hydroxyl functionality, which is potentially reactive in two-component polyurethane systems such as top coats for golf balls. The PETA level is preferred to be 5–20% of the coating solids, more preferably 10–20% and most preferably 15% of the coating solids. Although PETA is a preferred dual curable compound, the following compounds have multi-functional monomers and may also be used as the dual curable compound: hydroxy ethyl acrylate, hydroxy ethyl methacrylate, hydroxy propyl acrylate, hydroxy propyl methacrylate, caprolactone acrylate, polypropylene glycol monomethacrylate, and like acrylate and hydroxy functional monomers.

The dual curable top coat is applied to the golf ball by any number of methods commonly known in the art. For example, the top coat may be directly applied to golf balls using a spray gun or other atomizing device. After spraying, the balls are then cured by heating the balls at a temperature within the range of about 125 degrees F. to about 150 degrees F. At these conditions, the clear coat is then dry-to-touch and can be handled after ten minutes of baking. Complete curing of the balls results in about 72 to about 144 hours after the initial cure.

FIG. 1 illustrates a cross-sectional view of the finish construction of a golf ball 25. The finish is applied to a cover 30 that as previously mentioned may be composed of a polyurethane or ionomer material. A base coat 32 is applied over the cover 30. A tip mark area 34 illustrates the need for the tinted top coat since the base coat 32 is prevented by a tip of a golf ball holder from coating the tip mark area 34. In a polyurethane covered golf ball, such tip marks 34 could lead to exposed yellowing. A tinted top coat 36 is applied over the base coat 32, and covers the tip mark areas 34. Indicia 38 is printed on the tinted top coat 36.

Figure 2:
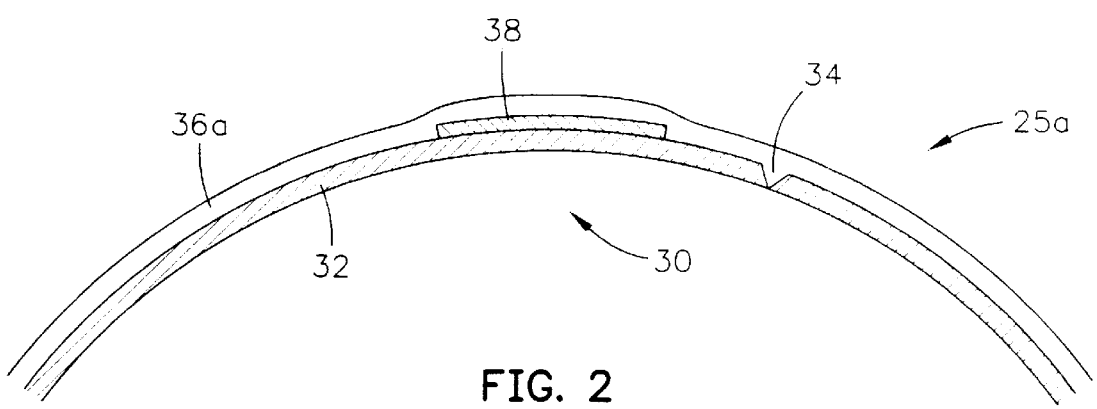
FIG. 2 is a cross-sectional view of a golf ball having indicia applied over the base coat.

FIG. 2 illustrates a more traditional finish structure for a golf ball 25a where a base coat 32 is applied over a cover 30, and indicia 38 is printed on the base coat 32. A clear coat 36a is applied over the indicia 38 and the base coat 32.

A most preferred top coat formulation for application to a golf ball is set forth below. The polyol component for a clear coat component is preferably composed of a solvent blend in an amount of 60 parts per weight of the polyol component; optical brightener in an amount of 0.01 parts per weight of the polyol component; thixotropic resin in an amount of 4 parts per weight of the polyol component; flow additive in an amount of 0.50 parts per weight of the polyol component; PETA in an amount of 5 parts per weight of the polyol component; dibutyltin dilaureate (catalyst) in an amount of 0.05 parts per weight of the polyol component; and polyester resin in an amount of 30 parts per weight of the polyol component. In this preferred embodiment, the polyisocyanate component contains ethyl acetate in an amount of 44 wt. %; a trimer of HDI in an amount of 18 wt. %; and a biuret of HDI in an amount of 38 wt. %.

A most preferred tinted top coat formulation for application to a golf ball is set forth below. The polyol component for the tinted top coat component is preferably composed of a white pigment grind base in an amount of 60 parts per weight of the polyol component; a solvent blend in an amount of 30 parts per weight of the polyol component; 2,4-pentanedione in an amount of 2 parts per weight of the polyol component; an adhesion promoter in an amount of 2.80 parts per weight of the polyol component; PETA in an amount of 5 parts per weight of the polyol component; and tinting aids in an amount of 0.20 parts per weight of the polyol component. In this preferred embodiment, the polyisocyanate component contains ethyl acetate in an amount of 44 wt. %; a trimer of HDI in an amount of 18 wt. %; and a biuret of HDI in an amount of 38 wt. %.

Tables Four and Five illustrate the testing of golf balls having the top coat of the present invention thereon. Table Four includes the weight of the base coat and top coat for three different formulations of the top coat of the present invention. Table Five demonstrates the performance of those three formulations.

TABLE 4

| Paint | I | II | III |
|---|---|---|---|
| Basecoat wet weight (mg) | 215–220 | 175–200 | 160–180 |
| Top coat wet weight (mg) | 90–110 | 110–120 | 110–130 |
| Total wet weight | 305–330 | 285–320 | 270–310 |
| Aesthetics | Low gloss | High gloss | high gloss |
| Formulation | | Single solvent no talc | color match white |

TABLE 5

| Performance | I | II | III |
|---|---|---|---|
| Paint durability | Good | Excellent | Excellent |
| Stamp durability | Good | Excellent | Excellent |
| Water soak | Excellent | Excellent | Excellent |
| Aero | Equivalent | Longer | Longer |
| Grass stain | Acceptable | Acceptable | Better |
| QUV | Excellent | Excellent | Excellent |
| Whiteness | Equivalent | Whiter | Equivalent |

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A coating for a golf ball, the coating comprising:
    a polyol component comprising pentaerythritol tetraacrylate in an amount of 2.0 to 10.0 parts per weight of the polyol component, an optical brightener component in an amount of 0.005 to 0.1 parts per weight of the polyol component, thixotropic additive component in an amount of 1.0 to 7.0 parts per weight of the polyol component, an adhesion promoter component in an amount of 0.1 to 1.0 parts per weight of the polyol component, a catalyst component in an amount of 0.01 to 3.0 parts per weight of the polyol component; and a polyester resin in an amount of 20.0 to 40.0 parts per weight of the polyol component; and a polyisocyanate component comprising
- a solvent blend in an amount of 30.0 to 60.0 parts per weight of the polyisocyanate component,
- an isocyanurate trimer of hexamethylene diisocyanate in an amount of 10.0 to 30.0 parts per weight of the polyisocyanate component, and
- a biuret of hexamethylene diisocyanate in an amount of 30.0 to 60.0 parts per weight of the polyisocyanate component.

\* \* \* \* \*